(12) United States Patent
Kneller et al.

(10) Patent No.: US 6,789,348 B1
(45) Date of Patent: Sep. 14, 2004

(54) FISHING ROD LIGHT

(76) Inventors: Brian C. Kneller, 3 Helen St., Selbyville, DE (US) 19975; Cheryle Ann Kneller, 3 Helen St., Selbyville, DE (US) 19975

( * ) Notice: Subject to any disclaimer, the term of this patent is extended or adjusted under 35 U.S.C. 154(b) by 0 days.

(21) Appl. No.: 10/428,860

(22) Filed: May 5, 2003

Related U.S. Application Data

(60) Provisional application No. 60/399,114, filed on Jul. 30, 2002.

(51) Int. Cl.$^7$ .......................... A01K 97/12; A01K 87/02
(52) U.S. Cl. ............................................. 43/17.5; 43/17
(58) Field of Search ...................... 43/17.5, 17, 18.1 R, 43/18.1 CT

(56) References Cited

U.S. PATENT DOCUMENTS

| | | | | |
|---|---|---|---|---|
| 2,575,049 A | * | 11/1951 | Dean | 43/17 |
| 3,017,499 A | | 1/1962 | Fore | 43/17.5 |
| 3,238,659 A | * | 3/1966 | Lamb, Jr. | 43/17 |
| 3,584,408 A | * | 6/1971 | Frick | 43/17 |
| 3,624,689 A | * | 11/1971 | Rizzo | 43/17 |
| 3,740,887 A | | 6/1973 | Van Leeuwen | 43/17.5 |
| 3,882,629 A | | 5/1975 | Kaye | 43/17 |
| 4,117,618 A | | 10/1978 | Utsler | 43/17.5 |
| 4,458,438 A | * | 7/1984 | McCulley | 43/17 |
| 4,697,375 A | | 10/1987 | Mills | 43/17.5 |
| 5,063,373 A | * | 11/1991 | Lindsley | 43/17 |
| 5,083,247 A | | 1/1992 | Robinson et al. | 43/17.5 |
| 5,179,797 A | | 1/1993 | Edwards et al. | 43/17.5 |
| 5,205,061 A | | 4/1993 | Echols, Jr. | 43/17.5 |
| 5,566,493 A | | 10/1996 | Minorics | 43/17.5 |
| 5,586,403 A | * | 12/1996 | Ward | 43/17.5 |
| 5,644,864 A | * | 7/1997 | Kelly | 43/17.5 |
| 5,738,433 A | | 4/1998 | Sparks | 43/17.5 |
| 5,826,366 A | * | 10/1998 | Matibe | 43/17.5 |
| 6,061,946 A | * | 5/2000 | Toelken | 43/17.5 |
| 6,122,853 A | | 9/2000 | Genous-Moore | 43/17.5 |
| 6,405,475 B1 | * | 6/2002 | Wallace et al. | 43/17.5 |
| 6,446,380 B1 | * | 9/2002 | Radosavljevic et al. | 43/17 |
| 6,594,942 B1 | * | 7/2003 | Sherwood et al. | 43/17.5 |

FOREIGN PATENT DOCUMENTS

| | | | |
|---|---|---|---|
| AU | 89450 B1 | * | 10/1998 |
| AU | 43472 B1 | * | 8/1999 |
| CA | 2009972 | | 8/1981 |
| CA | 2220119 B1 | * | 7/1999 |
| DE | 2732538 B1 | * | 2/1979 |
| DE | 2836769 B1 | * | 3/1980 |
| FR | 2473844 B1 | * | 7/1981 |
| GB | 1118237 | | 6/1968 |
| GB | 1364812 | | 8/1974 |
| GB | 2052231 A | | 1/1981 |
| GB | 2111811 B1 | * | 7/1983 |
| GB | 2170081 B1 | * | 7/1986 |
| GB | 2170084 B1 | * | 7/1986 |
| GB | 2175781 A | | 10/1986 |
| GB | 2175781 B1 | * | 12/1986 |
| GB | 2196222 B1 | * | 4/1988 |
| GB | 2258981 B1 | * | 3/1993 |
| GB | 2310350 B1 | * | 8/1997 |
| GB | 2315972 B1 | * | 2/1998 |
| JP | 4-222535 B1 | * | 8/1992 |
| JP | 9-187202 B1 | * | 7/1997 |
| JP | 9-252684 B1 | * | 9/1997 |
| JP | 2000-14279 B1 | * | 1/2000 |
| JP | 2001-148968 B1 | * | 6/2001 |
| JP | 2002-125528 B1 | * | 5/2002 |
| WO | WO-00/19813 B1 | * | 4/2000 |

* cited by examiner

*Primary Examiner*—Darren W. Ark
(74) *Attorney, Agent, or Firm*—Richard C. Litman

(57) ABSTRACT

An illuminated two-piece fiber glass fishing rod having a light emitting diode (LED) or a light bulb proximate its tip encased in an extended transparent tubular plastic portion as part of a hollow tip segment of the rod. The illumination is energized by battery encased in the handle of the hollow butt segment. The hollow tip and the butt segments are connected by a male-female electrical connection in the ferrules and rod segments. The segments are disassembled for portage.

3 Claims, 5 Drawing Sheets

FISHING ROD LIGHT

CROSS-REFERENCE TO RELATED APPLICATION

This application claims the benefit of U.S. Provisional Patent Application Ser. No. 60/399,114, filed Jul. 30, 2002.

BACKGROUND OF THE INVENTION

1. Field of the Invention

The present invention relates generally to fishing poles. More specifically, the invention is an illuminated fishing pole having an extended luminescent source incorporated proximate its tip.

2. Description of Related Art

The prior art of interest describes numerous illuminated fishing poles, but none discloses the present invention. There is a need in this crowded art for a two-piece fishing rod which has an extended lighted region incorporated proximate the rod's tip, and yet which is conveniently dismantled into two easily transportable rod pieces. The related art of interest will be discussed in the order of perceived relevance to the present invention.

U.K. Patent Application No. 2 175 781 A published on Dec. 10, 1986, for George C. Moore et al. describes a lighted fishing rod comprising a hollow fishing rod internally coated with a reflective layer. Three dry cell batteries are housed in the butt end, which end is provided with a removable cap. The batteries when energized by a on/off reciprocating switch on the butt, reflect light via a light bulb having a conical reflector inside the butt. The light is reflected through the hollow rod to a solid translucent circular cylindrical section" proximate the rod tip. The apparatus is distinguishable for requiring the bulb and reflector in the butt section of the rod to reflect light through a reflective inner rod surface to a solid translucent rod section.

U.K. Patent Application No. 2 052 231 A published on Jan. 28, 1981, for Brian D. Pavey describes a lighted fishing rod comprising an LED lamp positioned above the tip guide connected by one insulated wire through the hollow glass-fiber rod to the batteries in the handle accessible at the butt end. The other wire is grounded at the tip guide and to the batteries. The apparatus is distinguishable for requiring the 3 volt LED to be mounted above the tip guide and lack an on/off switch.

U.S. Pat. No. 6,061,946 issued on May 16, 2000, to L. Taizo Toelken describes a lighted, dual reel capable fishing rod adapted for the use of a spin-cast reel (on top of the handle) or a spinning reel (below the handle) with dual eyelets on top and below the rod. An extended bracket underneath and proximate the rod tip supports and end eyelet for the spinning reel mode. The rod tip is made of translucent plastic. The hollow handle contains a battery connected by electrical wires to an LED at the rod tip. The rod has connecting ferrules, but to avoid breaking the wires, a bungee pullout eliminator strap is provided. The end of the handle has an axial on/off pushbutton switch for the battery. It is noted that excessive illumination is not desired in the invention because the fish would be scared away. The lighted fishing rod is distinguishable for requiring a dual reel capacity, an LED at the tip of the rod, and a push-in on/off switch at the rear end of the handle.

U.K. Patent Application No. 1,364,812 published on Aug. 29, 1974, for Peter J. Watts describes a lighted fishing rod comprising a twelve feet long beach pole having a capped lamp at the tip above the tip guide connected to internal wires and energized by battery inside the butt end with an external switch. The separate pole parts are connected by connector elements with single pins and ground connections. A second embodiment provides printed circuit connections. A third embodiment the tubular walls of the pole provide incorporated conductive laminations. The apparatus is distinguishable for requiring single pin connections for its first embodiment.

U.S. Pat. No. 3,017,499 issued on Jan. 16, 1962, to Beaser G. Fore describes a two-piece illuminated fishing rod comprising an electric bulb at the tip of a hollow phosphorescent paint coated rod, which rod is removably connected to a hollow handle having an on/off switch and an internal battery. The device is distinguishable for requiring the bulb at the rod tip, a phosphorescent paint coated rod, and lacking the conductor connection in the middle of the rod.

U.S. Pat. No. 4,117,618 issued on Oct. 3, 1978, to Charles S. Utsler describes three embodiments of a fishing pole with spaced illumination means energized by a battery source in the hollow handle. A light bulb is present in front of the reel in a housing which also accepts the rod portion snugly with or without threading. The first embodiment (FIG. 3) employs a bundle of optical fibers, wherein one fiber emerges in front of each line guide at the tip of the pole. The second embodiment (FIG. 4) employs a single optical fiber which is looped to emerge proximate each guide and at the tip of the rod. The third embodiment (FIG. 5) employs electrical wiring to illuminate a light emitting diode (LED) under each guide, between guides, opposite the guides, and at the rod tip. These embodiments are distinguishable because the illumination is required to appear throughout the rod length at separate and distinct regions and at the tip, and lack the essential conductor connection in the middle of the rod.

U.S. Pat. No. 3,740,887 issued on Jun. 26, 1973, to Marion Van Leeuwen describes a nibble detecting light for fishing poles comprising a capped housing attached to the rod tip, which housing contains a light bulb, a compression spring contact and a battery. The fishing line passes through an eye in an upstanding flange of the housing. The cap is screwed in to make the compression spring contact the battery to light the bulb. The device is distinguishable for requiring a housing at the rod tip having an eye for the fishing line.

U.S. Pat. No. 3,882,629 issued on May 13, 1975, to John A. Kaye describes a fishing light assembly for attachment to a fishing rod comprising a mercury switch activated light bulb in a casing, which casing is mounted below the rod proximate the tip. Bending of the rod by a fish biting causes the bulb to light. The device is distinguishable for requiring a mercury switch for initiating the light.

U.S. Pat. No. 4,697,375 issued on Oct. 6, 1987, to Kenneth L. Mills describes a fishing pole tip signal light assembly comprising a gallium arsenide-gallium phosphide LED emitter situated in the mounting sleeve of the guide ring or either exposed or embedded in the guide ring by epoxy resin. The resin can also contain luminous or phosphorescent material. The wiring is connected to a battery in or by the handle or a lithium battery affixed to the tip end (not shown). The device is distinguishable for requiring special LED compositions which must be mounted at the rod tip.

U.S. Pat. No. 5,083,247 issued on Jan. 21, 1992, to Randolph W. Robinson et al. describes a fishing rod lighting system comprising a light bulb housed in the handle in front of the reel underneath and activated by a single pole switch on top of the handle. The switch functions to energize a set of two batteries in the handle. The object of the lighting system is to light the eyelets and line under poor ambient light conditions. The system is distinguishable for requiring the light source to illuminate the line and all eyelets of the fishing rod.

U.S. Pat. No. 5,179,797 issued on Jan. 19, 1993, to John J. Edwards et al. describes a night fishing light for a fishing rod comprising an LED light fastened by a Velcro strap underneath the rod at the tip with the conductor wires strapped by cable ties underneath the pole to the batteries in a holder strapped underneath the handle in front of the reel by another Velcro strap. The device is distinguishable for requiring external attachment to a fishing rod.

U.S. Pat. No. 5,205,061 issued on Apr. 27, 1993, to David L. Echols, Jr. describes a movement indicator assembly kit for a fishing rod comprising in a first embodiment a light-emitting diode (LED) located adjacent to a battery containing housing with an on/off switch attached by Velcro on the top side of the rod in front of the reel. The LED light traverses an optic fiber inside the rod to the tip having a reflector cap. In a second embodiment, the batteries are housed in the butt end of the rod. The kits are distinguishable for requiring the light and reflector cap at the rod tip, an optic fiber traversing the rod, and lacking ferrules for disassembling the rod.

U.S. Pat. No. 5,566,493 issued on Oct. 22, 1996, to Richard T. describes a fishing rod having a lamp with a first retractable universal bulb and a second light bulb. The first bulb is positioned on the end of a flexible connector tube which traverses inside the handle from a dorsal switch and exits underneath and positioned upwards to serve as a bug light or to illuminate the reel. A second light bulb positioned in the handle with batteries illuminates a bundle of fiber optic cables which illuminate each eye or guide. The dorsal switch can be two-way on/off or three-way with a flashing mode. The elongated tube can be replaced with a bulb underneath in front of the reel. The lighting apparatus is distinguishable for requiring at least two light bulbs and fiber optic cables.

U.S. Pat. No. 5,738,433 issued on Apr. 14, 1996, to Kevin D. Sparks describes a fishing pole which is automatically illuminated when a fish strikes the line. The pole includes a hollow handle provided with a switch and an internal light bulb under the reel and a battery. The rod is hollow, translucent and has wires or alternatively contains fiber optic cables which can also externally wrap around the rod length. A pressure sensor mounted either internally or externally at the pole tip inside the eyelet detects bending of the pole to illuminate the light bulb. The apparatus is distinguishable for requiring a pressure sensor and fiber optic cables.

U.S. Pat. No. 6,122,853 issued on Sep. 26, 2000, to Christine Genous-Moore describes a night light fish strike indicator for a fishing rod comprising batteries and a beam concentrator lens in a housing attached on top of the rod in front of the reel or inside the handle. A fiber optic cable extends from the concentrator lens to the tip above the eyelet and is housed in a U-shaped indicator. The apparatus is distinguishable for requiring a fiber optic and beam concentrator lens.

U.K. Patent Application No. 1,118,237 published on Jun. 26, 1968, for Charles H. Ilsen describes a lighted fishing rod comprising a light bulb attached above the rod tip. The bulb is connected by an inner conductive wire to a single pin plug and spring-loaded socket for detachable connection to an external large D.C. battery. The apparatus is distinguishable for requiring the bulb at the rod tip and an external large D.C. battery.

Canadian Patent Application No. 2,009,972 published Aug. 8, 1991, for Randolph W. Robinson et al. describes a double-lighted fishing rod with a spinning reel underneath comprising batteries inside the butt. In a first embodiment, a single pole switch is located on top of the butt to energize a first lamp with lens to illuminate the eyelets to the tip. In a second embodiment, a second lamp with lens is positioned behind the first lamp to illuminate the reel. The lamps are controlled by a two-way switch with the option of separate or simultaneous control of the two lamps. The apparatus is distinguishable for requiring the metal tube and directing the illumination forward and optionally rearward underneath the rod.

None of the above inventions and patents, taken either singly or in combination, is seen to describe the instant invention as claimed.

SUMMARY OF THE INVENTION

The present invention solves the problem of "seeing" the bite when fishing in darkness, especially when the fisherman is physically remote from the rod. In the present invention, a fishing rod has an extended illuminated rod section proximate the rod tip. The illumination is supplied by either a light bulb or a light-emitting diode (LED) installed in the extended section within a transparent plastic tube. The bulb or LED is energized by a battery source enclosed in the butt of the rod. A set of insulated wires connects the battery source to the illuminating means. The rod has two segments for enabling portage, and requires connection means in the ferrule. The invention can be used for either a spin-cast reel or spinning reel supporting rod. An on/off switch, either a slide type or a pushbutton, is located on the butt or handle.

Accordingly, it is a principal object of the invention to provide an extended light portion integrated in a fishing rod.

It is another object of the invention to provide the extended light portion proximate the rod tip.

It is a further object of the invention to provide an electrical connection means for a two-piece fishing rod.

Still another object of the invention is to provide a switch on the rod handle for operating the extended light portion.

Yet another object of the invention is to provide a versatile illumination system for a fishing rod using either a spin-casting reel or a spinning reel.

It is an object of the invention to provide improved elements and arrangements thereof in an apparatus for the purposes described which are inexpensive, dependable and fully effective in accomplishing their intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is directed to a fishing rod having an extended and integrated illuminated tip portion for fishing in darkness. The illuminated tip functions to alert the fisherman when a fish bites even though the fisherman is at a distance from the fishing rod.

A fisherman fishing in the evening from a river bank or a pier must always keep an eye on the fishing rod to detect when a fish is biting. If the bite is undetected, the fish would probably eat the bait and escape. The intense light of a lantern would scare nearby fish and deter the fish from approaching the pole. A problem also arises in disassembling a two-piece fishing rod for portage if there are electrical conductor wires inside the hollow rod. A further problem occurs from the use of two types of casting reels which fit on top or below the handle of the rod.

Figure 1:
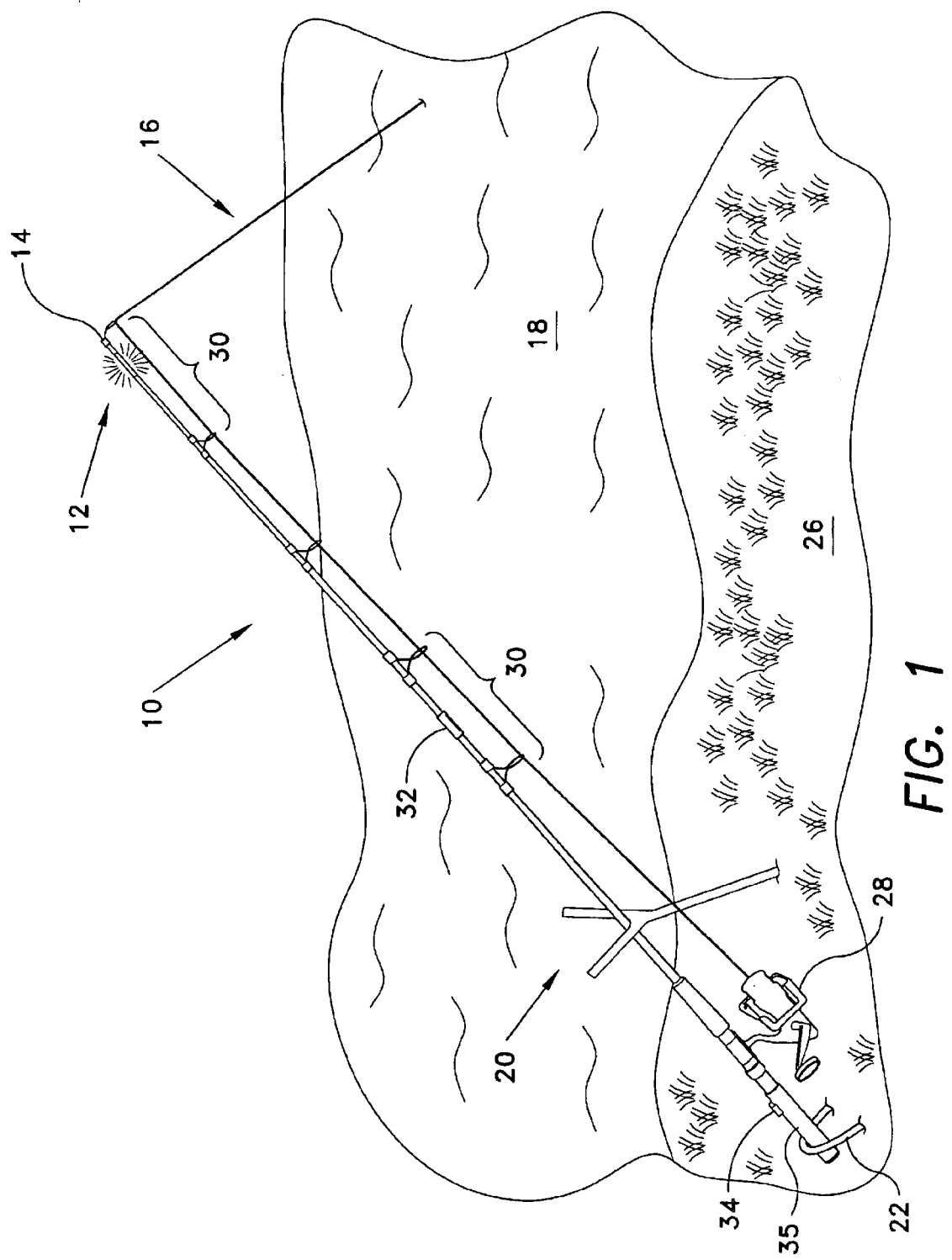
FIG. 1 is an environmental, perspective view of a fishing rod and a light therefor according to the present invention.

FIG. 1 illustrates a fishing rod 10 made of tubular fiberglass and having an integrated and extended illuminated portion 12 proximate a tip 14. The rod 10 with its fishing line 16 in the water 18, is supported by a forked stick 20. A wire hook 22 disposed on the handle 35 of the rod is utilized to secure the rod on the river bank 26. Although a spinning reel 28 is illustrated, it should be understood that a spin-casting reel can also be accommodated. Multiple eyelets 30 guide the line 16 past a ferrule 32, which ferrule connects the segments of rod 10 as will be explained below. An on/off switch 34 is located on the handle 35.

Figure 2A:
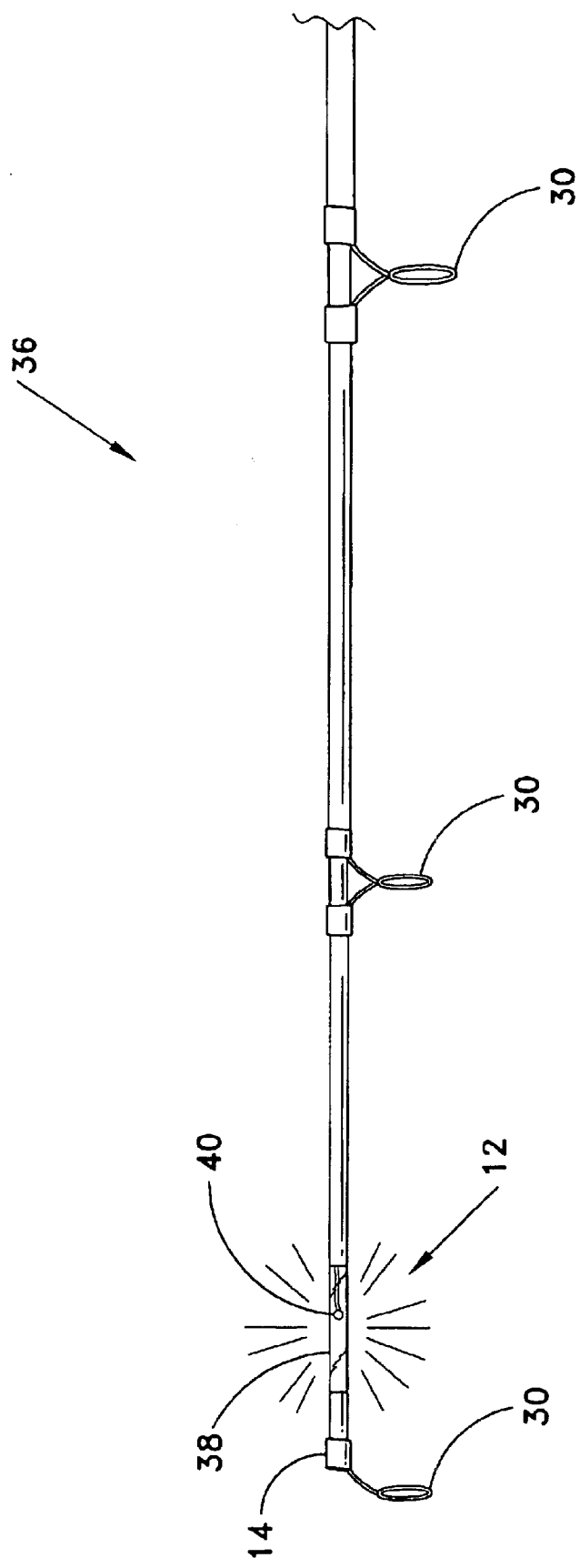
FIG. 2A is an elevational view of the distal half or tip portion of the fishing rod.
Figure 2B:
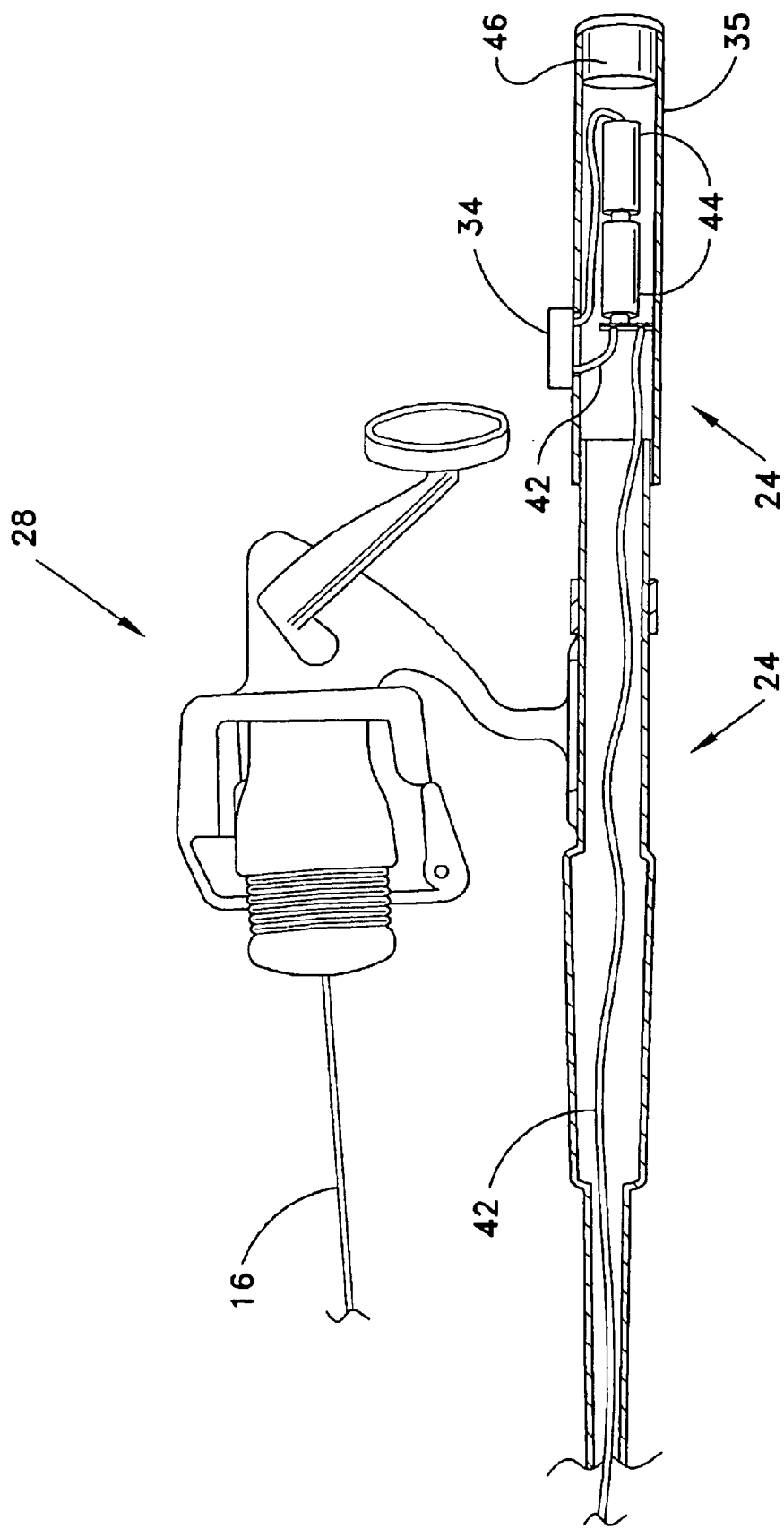
FIG. 2B is an elevational view of the proximate half or handle portion of the fishing rod partially sectioned.
Figure 3:
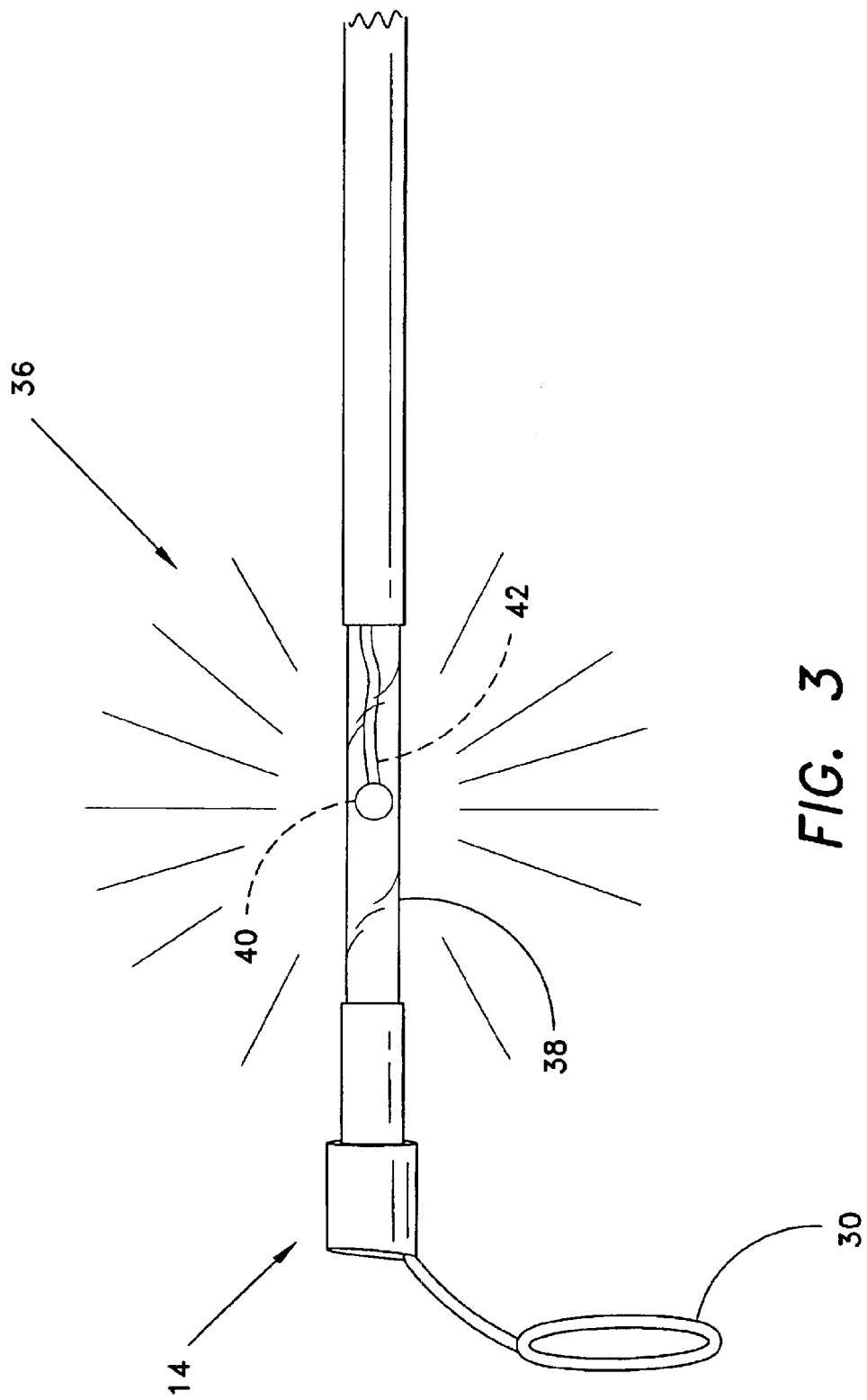
FIG. 3 is an enlarged elevational view of the illuminated portion of the fishing rod.

Turning to FIGS. 2A and 3, a portion of the distal half, which includes tip segment 36, is illustrated to more clearly show the extended illuminated portion 12. A six-inch long transparent plastic tube 38 contains a light bulb or an LED lamp 40. Bulb/lamp 40 is connected to an insulated electrical conductor 42. Tube 38 is positioned adjacent tip end 14. As shown in FIG. 2B, conductor 42 extends through the butt segment 24 and is electrically connected to switch 34 via batteries 44. Batteries 44 are housed in the handle 35. An end cap 46 seals the end of the handle 35, and can be either a push-in cap or threaded (not shown).

Figure 4:
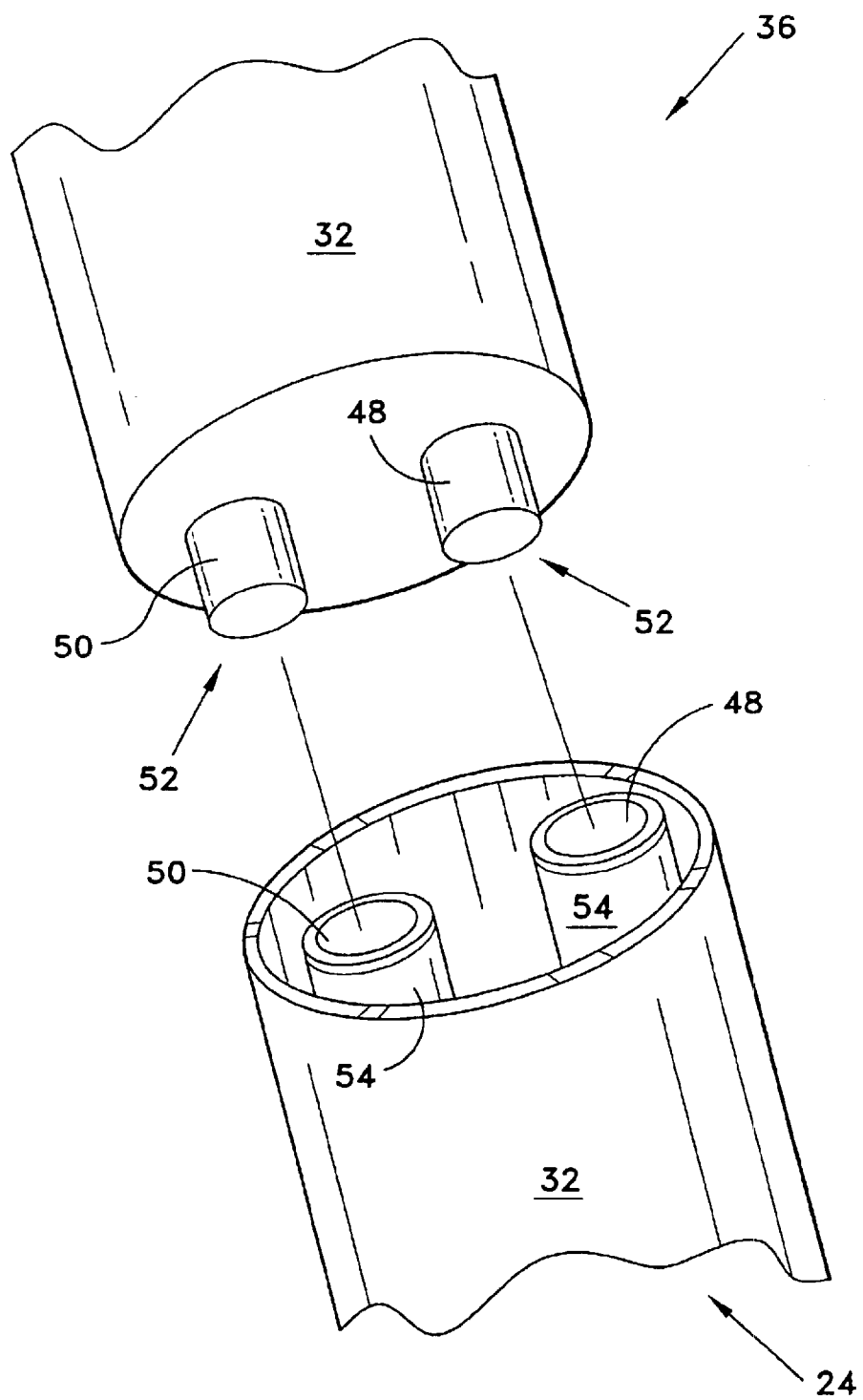
FIG. 4 is an enlarged perspective view of the connecting portions of the fishing pole halves.

In order to dismantle the rod segments for easy portage, it is necessary to provide means to separate the electrical conductor 42. As shown in FIG. 4, connecting ferrule 32 is provided with a female sockets 54 for receiving male pins 52. Conductor 42 is separated so that the positive wires electrically terminate at 50 in respective female and male connectors 52, 54. The negative wires electrically terminate at 48 in connectors 52, 54. The location of the pins 52 and sockets 54 can be on either of the rod tip segment or the butt segment. The pins 52 and sockets 54 also perform an important function of strengthening the connection between the rod segments when assembled.

It is to be understood that the present invention is not limited to the sole embodiment described above, but encompasses any and all embodiments within the scope of the following claims.

We claim:

1. An illuminated fishing rod comprising:

a tip segment having a tip end;

a transparent hollow tube section integrated in said tip segment, said transparent hollow tube section being approximately six inches long and positioned adjacent said tip end;

a butt segment having a hollow handle, said handle having an open end;

an end cap disposed on said handle and adapted to close said open end;

at least one battery disposed in said hollow handle;

a switch located on the handle and electrically connected to said at least one battery;

an illumination source, said illumination source being disposed in said transparent hollow tube section;

a first ferrule part disposed on said tip segment, said first ferrule part consisting of two protruding, male, electrically conductive pins disposed thereon;

an electrical conductor connecting said illumination source to said two protruding, male, electrically conductive pins;

a second ferrule part disposed on said butt segment, said second ferrule part consisting of two electrically conductive sockets housed therein; and another electrical conductor connecting said two electrically conductive sockets to said at least one battery and said switch, whereby the illuminated fishing rod can be disassembled into said tip segment and said butt segment for easy and convenient portage and wherein said two protruding, male, electrically conductive pins and said two electrically conductive sockets strengthen connection between said tip segment and said butt segment when assembled.

2. The illuminated fishing rod according to claim 1, wherein said illumination source is a light bulb.

3. The illuminated fishing rod according to claim 1, wherein said illumination source is an LED lamp.

\* \* \* \* \*